United States Patent [19]
Smith

[11] Patent Number: 5,853,133
[45] Date of Patent: Dec. 29, 1998

[54] APPARATUS FOR PRODUCING SQUARE EDGED FORMING PACKAGES FROM A CONTINUOUS FIBER FORMING PROCESS

[75] Inventor: Roy E. Smith, Columbus, Ohio

[73] Assignee: Owens Corning Fiberglas Technology, Inc., Summit, Ill.

[21] Appl. No.: 680,083

[22] Filed: Jul. 16, 1996

[51] Int. Cl.[6] .............................. B65H 54/00; B65H 55/04
[52] U.S. Cl. ...................... 242/18 R; 242/18 D; 242/178
[58] Field of Search .......................... 242/18 R, 18 DD, 242/43 R, 18 G, 176, 178

[56] References Cited

U.S. PATENT DOCUMENTS

| | | |
|---|---|---|
| 1,591,020 | 7/1926 | Damon .................................. 242/18 R |
| 2,922,491 | 1/1960 | Macks . |
| 2,935,363 | 5/1960 | Schindel . |
| 2,986,433 | 5/1961 | Herrmann . |
| 3,109,602 | 11/1963 | Smith . |
| 3,292,871 | 12/1966 | Smith et al. . |
| 3,334,980 | 8/1967 | Smith . |
| 3,367,587 | 2/1968 | Klink et al. . |
| 3,371,877 | 3/1968 | Klink et al. . |
| 3,408,012 | 10/1968 | Smith et al. . |
| 3,498,550 | 3/1970 | Klink et al. . |
| 3,523,650 | 8/1970 | Klink et al. . |
| 3,612,631 | 10/1971 | O'Connor . |
| 3,664,596 | 5/1972 | Lenk . |
| 3,819,122 | 6/1974 | Genson . |
| 3,838,827 | 10/1974 | Klink et al. . |
| 3,900,166 | 8/1975 | Sartori . |
| 3,998,404 | 12/1976 | Reese . |
| 4,045,195 | 8/1977 | Drummond . |
| 4,047,674 | 9/1977 | Kamp .................................. 242/18 DD |
| 4,130,248 | 12/1978 | Hendrix et al. . |
| 4,167,252 | 9/1979 | Klink et al. . |
| 4,170,459 | 10/1979 | Myers . |
| 4,206,884 | 6/1980 | Myers . |
| 4,364,762 | 12/1982 | Sullivan et al. . |
| 4,383,653 | 5/1983 | Nakazawa et al. ................ 242/18 R X |
| 4,415,126 | 11/1983 | Nakazawa et al. .................... 242/43 R |
| 4,465,241 | 8/1984 | Merritt .............................. 242/18 R X |
| 4,638,955 | 1/1987 | Schippers et al. ................ 242/18 R X |
| 4,958,664 | 9/1990 | Oppl et al. . |
| 5,033,685 | 7/1991 | Busenhart et al. ..................... 242/18 R |

OTHER PUBLICATIONS

"Micro–Fog Lubricator," C.A. Norgren Co., Apr. 1988.

*Primary Examiner*—Michael Mansen
*Attorney, Agent, or Firm*—C. Michael Gegenheimer; Inger H. Eckert

[57] ABSTRACT

An apparatus is provided for forming a cylindrical package of wound strand having a radially outer surface with first and second edges and a central portion therebetween. The apparatus includes a rotatable collet for receiving the strand and winding the strand to build a package. A guide is mounted for reciprocation from edge to edge of the package to lay the strand in a helical pattern on the package surface as the package rotates. A roller bail mounted for contacting the surface as the package is being built for holding the strand in place on the package. The roller bail is divided into separate rollers with each roller contacting the package surface at one of the edges and not contacting the package surface at the central portion.

18 Claims, 4 Drawing Sheets

APPARATUS FOR PRODUCING SQUARE EDGED FORMING PACKAGES FROM A CONTINUOUS FIBER FORMING PROCESS

CROSS-REFERENCE TO RELATED APPLICATIONS

The present invention is related to the inventions of the following U.S. patent applications: Ser. No. 08/683,014, entitled METHOD AND APPARATUS FOR LUBRICATING CONTINUOUS FIBER STRAND WINDING APPARATUS, filed Jul. 16, 1996; Ser. No. 08/683,073, entitled WOVEN FABRIC MADE WITH A YARN HAVING PERIODIC FLAT SPOTS, filed Jul. 16, 1996 and issued Nov. 25, 1997 as U.S. Pat. No. 5,690,150; Ser. No. 08/683,005, entitled ZERO TWIST YARN HAVING PERIODIC FLAT SPOTS, filed Jul. 16, 1996, now U.S. Pat. No. 5,731,084; Ser. No. 08/683,015, entitled METHOD OF CONTROLLING FLAT SPOTS IN A ZERO TWIST YARN, filed Jul. 16, 1996; Ser. No. 08/683,017, entitled METHOD OF WEAVING A YARN HAVING PERIODIC FLAT SPOTS ON AN AIR JET LOOM, filed Jul. 16, 1996; and Ser. No. 08/683,016, entitled SELF-SUPPORTING YARN PACKAGE.

TECHNICAL FIELD

This invention relates to the production of glass fiber strands, and in particular, to winding the glass fiber strands to form packages. More particularly, this invention relates to using a split roller bail assembly to produce cylindrical packages having square edges.

BACKGROUND OF THE INVENTION

Typically, continuous fibers, such as glass fibers, are mechanically pulled from a feeder of molten glass. The feeder has a bottom plate, or bushing, which has anywhere from 200 to 10,000 orifices. In the forming process, the strand is wound around a rotating drum, or collet, to form, or build, a package. The completed package consists of a single long strand which is formed from a collection of glass fibers, or can be comprised of fibers of other materials such as other mineral materials or organic polymer materials.

A protective coating, or size, is applied to the fibers which allows them to move past each other without breaking when the fibers are collected to form the single strand. The size also improves the bond between the strands and the plastic matrix. The size may also include bonding agents which allow the fibers to stick together forming an integral strand.

It is preferable that the package be wound in a manner which enables the strand to be easily unwound, or paid out. It has been found that a winding pattern consisting of a series of helical courses laid on the collet builds a package which can easily be paid out. Such a helical pattern prevents adjacent loops or wraps of strand from fusing together should the strand be still wet from the application of the size material. The helical courses are wound around the collet as the package begins to build. Successive courses are laid on the outer surface of the package, continually increasing the package diameter, until the winding is completed and the package is removed from the collet.

Typically, continuous fibers, such as glass fibers, are mechanically pulled from a feeder of molten glass. The feeder has a bottom plate, or bushing, which has anywhere from 200 to 10,000 orifices. In the forming process, the strand is wound around a rotating drum, or collet, to form, or build, a package. The completed package consists of a single long strand. It is preferable that the package be wound in a manner which enables the strand to be easily unwound, or paid out. It has been found that a winding pattern consisting of a series of helical courses laid on the collet builds a package which can easily be paid out. Such a helical pattern prevents adjacent loops or wraps of strand from fusing together should the strand be still wet from the application of the size material. The helical courses are wound around the collet as the package begins to build. Successive courses are laid on the outer surface of the package, continually increasing the package diameter, until the winding is completed and the package is removed from the collet.

A strand reciprocator guides the strand longitudinally back and forth across the outer surface of the package to lay each successive course. A known strand reciprocator is the spiral wire type strand oscillator. It consists of a rotating shaft containing two outboard wires approximating a spiral configuration. The spiral wires strike the advancing strand and direct it back and forth along the outer surface of the package. The shaft is also moved longitudinally so that the rotating spiral wires are traversed across the package surface to lay the strand on the package surface. While building the package, the spiral wire strand oscillator does not contact the package surface. Although the spiral wire strand oscillator produces a package that can be easily paid out, the package does not have square edges. A package having square edges can have a larger diameter than packages with rounded edges. Also, a square edged package can be stacked during shipping. It is desirable to build cylindrical packages having square edges and larger diameters.

A known strand reciprocator which produces square edged, cylindrical packages includes a cam having a helical groove, a cam follower which is disposed within the groove and a strand guide attached to the cam follower. As the cam is rotated, the cam follower and strand guide move the strand longitudinally back and forth across the outer surface of the rotating package to lay each successive course. A rotatable cylindrical member, or roller bail, contacts the outer surface of the package as it is being built to hold the strand laid in the latest course in place at the package edges as the strand guide changes direction. The contact between the roller bail and the rotating package surface causes the roller bail to rotate, and the speed of the roller bail surface is generally equal to the speed of the package surface. An alternative version uses the strand guide itself to contact the package and hold down the strand momentarily at the edge of the package.

To increase productivity, several packages are built simultaneously on a single collet. A separate strand is formed for each package, and a separate strand reciprocator oscillates each strand to build the packages simultaneously. The strand reciprocators are mounted on an arm which moves the strand reciprocators away from the collet as the package radius increases while keeping the roller bails in contact with the package surfaces. The fiber forming process, including the bushing temperature, is controlled to keep the fiber diameters constant throughout the collection process, and to keep the package radii of each of the packages increasing at a similar rate.

Process variations do occur, however, resulting in slight variations in package size along the collet during the collection process. These differences in the relative radii of the packages on the collet cause roller bails to occasionally leave the surface of a package. When a roller bail loses contact with the package surface, the rotational speed of the roller bail begins to decrease. As the surface of the roller bail comes back into contact with the package surface the rotational speed of the roller bail increases until the surface of the roller bail is traveling at the same speed as the surface of the package. Due to bearing friction and the inertia of the roller bail, the roller bail takes time to spin back up to speed. While the roller bail is spinning back up to speed, the difference in speed between the package surface and the roller bail surface causes the roller bail to skid against the package surface. The skidding roller bail produces abrasive forces which can break fibers in the strand if the inertia is too high. In addition, skidding can occur during startup as the rotational speed of the collet is increased. Strand fibers that break tend to separate from the strand as it is wound on the package and wrap around the rotating roller bail, creating a snarl which can ruin the package.

It is desirable to reduce the skidding so that fewer fibers in the strand will be broken. Also, it is desirable to reduce this snarling by breaking the snarling fibers and preventing them from continuing to wrap around the roller bail.

SUMMARY OF THE INVENTION

According to this invention there is provided an apparatus for forming a cylindrical package of wound strand having first and second ends and a radially outer surface with first and second edge portions and a central portion therebetween. The apparatus includes a rotatable collet for receiving the strand and winding the strand to build a package. A guide is mounted for reciprocation from edge to edge of the package to lay the strand in a helical pattern on the package surface as the package rotates. A roller bail mounted for contacting the surface as the package is being built for holding the strand in place on the package. The roller bail is divided into separate rollers with each roller contacting the package surface at one of the edges and not contacting the package surface at the central portion. Each of the rollers has a cylindrical edge end contacting the surface of the package and a tapered, inner end extending towards the central portion of the package surface.

In one of its specific embodiments the roller bail contacts the surface of the package along lines having a total length which is generally between about 5% to about 80% of the length of the package between the first and second ends.

In its preferred embodiment, the roller bail contacts the surface of the package along lines having a total length which is generally between about 10% to about 50% of the length of the package between the first and second ends.

According to this invention there is also provided an apparatus for winding a fiber strand to build a cylindrical strand package having an outer surface with spaced apart edges and a central portion therebetween. The apparatus consists of a roller bail assembly including a contact surface rotatably mounted for contact with the package surface to hold the strand at the package edges and a break surface connected to the contact surface for breaking broken strand fibers that have wound around the contact surface.

DETAILED DESCRIPTION AND PREFERRED EMBODIMENTS

Figure 1:
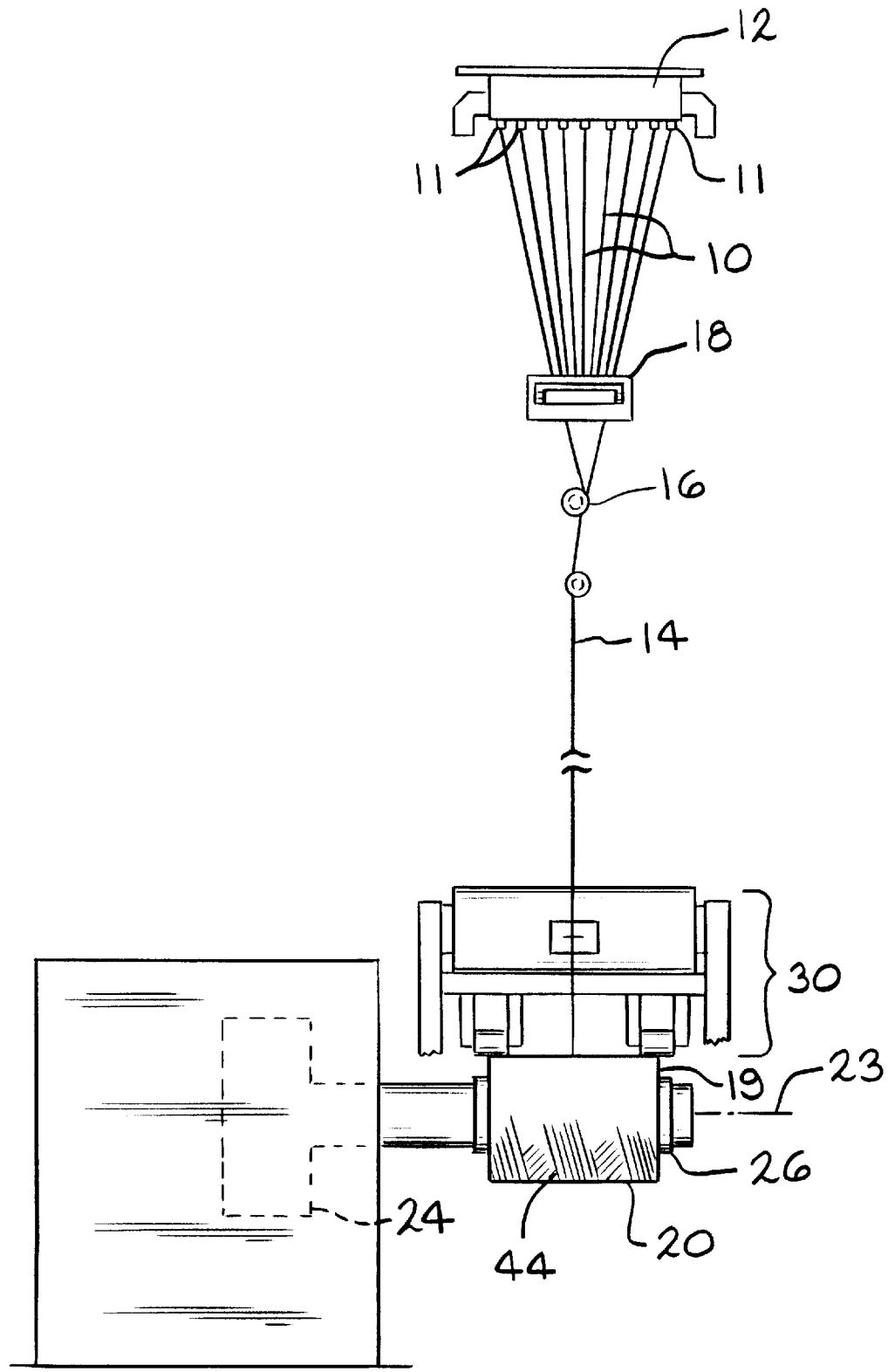
FIG. 1 is a schematic view in elevation of apparatus for forming, collecting and winding fiber strands according to the principles of the invention.
Figure 2:
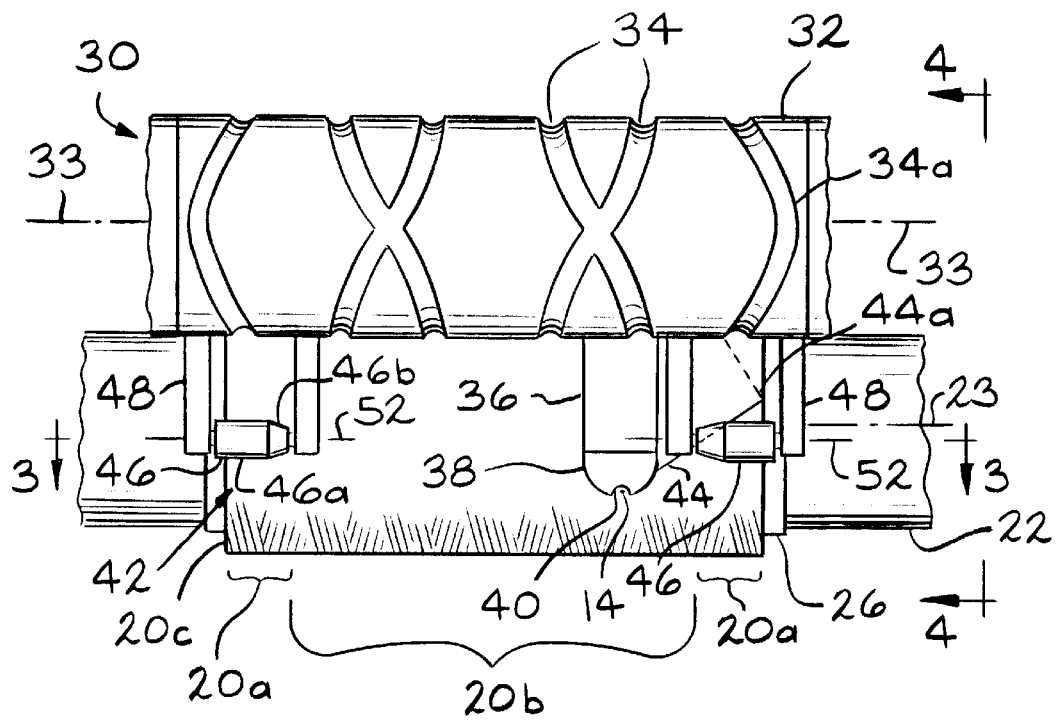
FIG. 2 is an enlarged, schematic view in elevation of the strand reciprocator shown in FIG. 1.

FIGS. 1 and 2 show apparatus for forming, collecting, and winding strands in which fibers 10 are drawn from a plurality of orifices 11 in a bushing 12 and gathered into a strand 14 by means of a gathering member 16. A size suitable for coating the fibers can be applied to the fibers by any suitable means, such as size applicator 18. The strand is wound around a rotating collet 22 to build a cylindrical package 19. The package, formed from a single, long strand, has a radially outer surface 20 with square edge portions 20a and a central portion 20b between them. The square edge portions 20a form generally right angles with the package ends 20c. The outer surface of the cylindrical package is preferably between about 10 cm to about 40 cm long, but may be longer or shorter depending on the application. The collet is adapted to be rotated about an axis of rotation 23 by any suitable means such as a motor 24. Any suitable package core material such as a cardboard tube 26 can be disposed on the collet to receive the strand package.

FIG. 2 shows a strand reciprocator 30 which guides the strand 14 laterally back and forth across the package surface 20 to lay the strand in courses 44 on the package surface. The strand reciprocator includes a cylindrical cam 32 having a helical groove 34. The cam is mounted for rotation and preferably made of a hard material, such as stainless steel, but any suitable material can be used. The strand reciprocator further includes a cam follower 36 that is disposed in the groove 34. The cam follower extends outwardly from the cam and a strand guide 38 is attached to the end. The cam follower is preferably made of a plastic or nylon material, but any suitable material can be used. A notch 40 is formed in the strand guide to hold the strand 14. Rotation of the cam causes the cam follower to follow the helical groove, thereby causing the strand guide to move laterally across the package surface.

Figure 3:
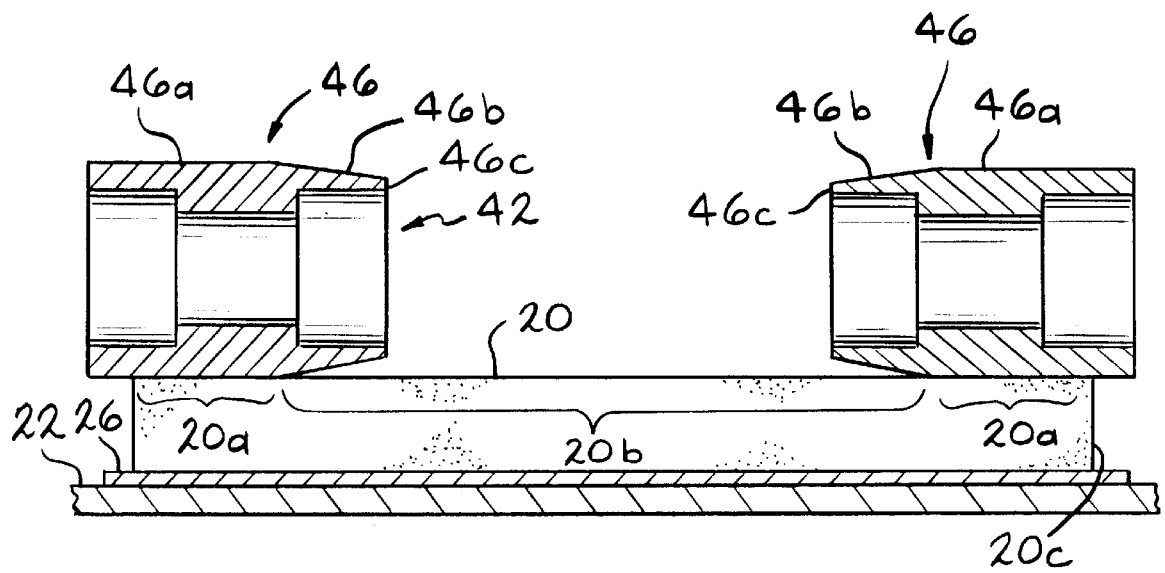
FIG. 3 is a schematic cross-sectional view in elevation of the apparatus of FIG. 2, taken along line 3—3.

Referring now to FIGS. 2 and 3, the strand reciprocator further includes a roller bail assembly 42 for holding the strand courses 44 in place at the edge portions 20a of the package surface 20 as the strand guide 38 changes direction. The roller bail assembly includes a pair of spaced apart, or split rollers 46. The rollers have generally cylindrical edge ends 46a and tapered inner ends 46b. The cylindrical edge ends contact the package surface at the edge portions 20a. The tapered inner ends extend from the edge ends towards the central portion of the package surface 20b. The rollers do not contact the surface of the package at the central portion of the package 20b. Each of the rollers 46 is independently mounted for rotation by mounts 48. One or more bearings (not shown) are located between the roller bails and the mounts to allow the roller bails to rotate freely by reducing friction. Although the roller bails are shown as mounted at both the edge ends and the inner ends, the roller bails may be cantilevered, being mounted at only one end. Each roller is made from a hard material, such as stainless steel, but any suitable material may be used. The rollers preferably weigh approximately 50 grams each, but may be heavier or lighter depending on their size and the application. They are preferably hollow to minimize weight and inertia, but may be solid. Each roller is preferably about 2 cm long, but they may be longer or shorter depending on the application.

The split roller bails are preferably coaxial, contacting the package surface along a portion of a line 52 which is generally parallel to the package axis of rotation 23, although, any suitable orientation of the roller bails may be used. Using 2 cm long roller bails, the length of contact between the roller bails and the typical package surface will be approximately 10% to 50% of the length of the outer surface of the package. A longer or shorter length of contact between the roller bails and the package surface may be used depending on the application.

Figure 4:
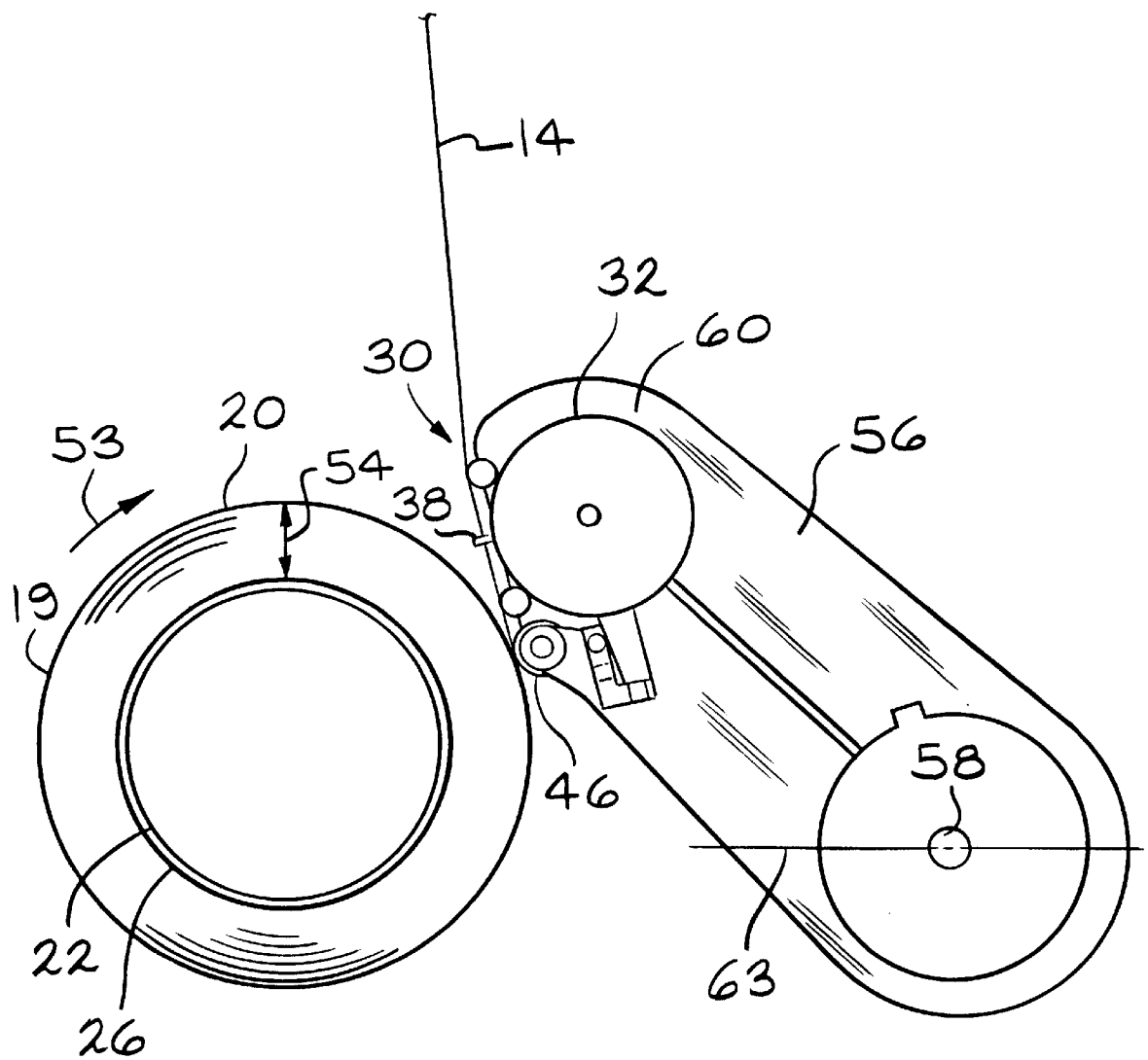
FIG. 4 is an end view in elevation of a portion the roller bail assembly of FIG. 1.

The package rotates during winding as shown by line 53 in FIG. 4. As the package builds, the radius 54 increases. To accommodate the increasing package radius, the strand reciprocator 30 is mounted on an arm 56. To accommodate the increasing package radius, the arm moves away from the collet along line 63 to keep the proper contact between the surface of the rollers and the package surface and prevent the strand courses 44a from pulling away from the edge portions 20b of the package surface.

Figure 5:
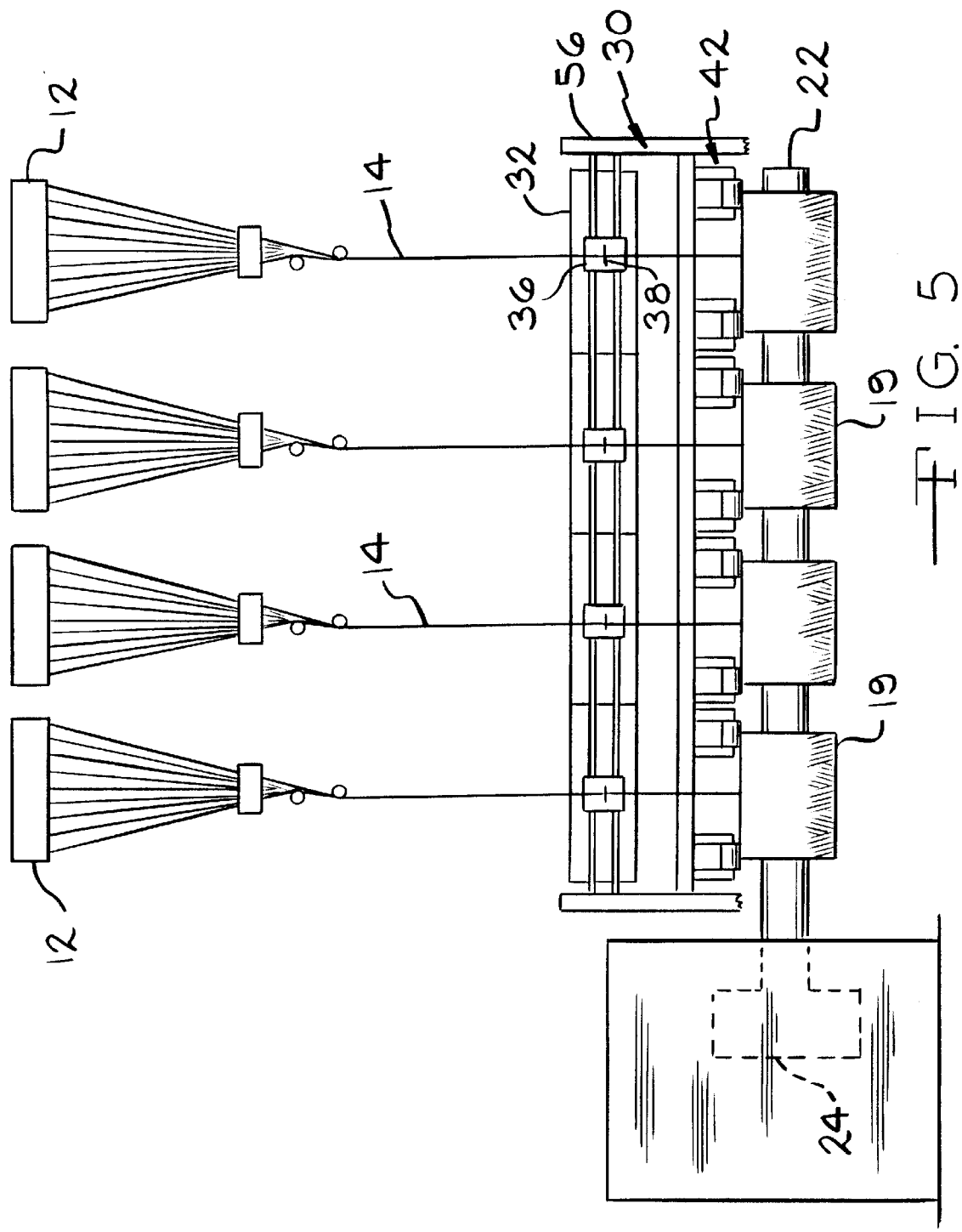
FIG. 5 is a diagrammatic view of an embodiment of the invention in which several packages are being wound simultaneously.

Several packages can be built simultaneously on the collet, as shown in FIG. 5. Each package is built by drawing separate strands 14 from separate bushing sections. The strands are wound around a single collet 22 to form packages 19. A separate strand reciprocator, including cam 32, cam follower 36, strand guide 38 and roller bail assembly 42, is used to build each package. The packages are spaced apart along the collet and the strand reciprocators are spaced along the arm 56 in a similar manner so as to be aligned with the packages.

The winding apparatus operates as follows. The strand reciprocator 30 guides the strand 14 as it is laid on the outer surface of the package. The strand is held by notch 40 in the strand guide 38 and wound around the rotating collet 22 or a package core 26 disposed about the collet. The cam 32 is oriented near the package and rotates about an axis 33 generally parallel to the package axis of rotation 23. The cam follower is disposed within the cam groove 34, but is prevented from rotating with the cam. As the cam rotates, the cam follower is moved laterally by the helical groove in a direction generally parallel to the package axis of rotation 23. The helical groove is continuous, having curved ends 34a that cause the cam follower to move to the end of the package and then reverse direction. The strand guide is attached to the cam follower and it traverses the outer surface of the package, reciprocating back and forth from end to end.

The helical winding pattern of each strand course 44 is formed by reciprocating the strand across the package surface while rotating the package. As the strand guide approaches the package edge portion 20a, the strand is laid on the package surface under the roller tapered inner edge 46b. The strand guide continues to move towards the end of the package 20c and the strand course, shown in phantom at 44a, moves between the package surface and the cylindrical edge end of the roller which is in contact with the package surface. When the cam follower travels through the curved end 34a of the groove 34, the strand guide 38 changes direction and moves away from the package edge and towards the central portion of the package 20b. The contact between the roller bails and the package surface holds the strand course 44a in place at the edge portions 20a of the package surface, when the strand guide changes direction. By preventing the strand courses 44a from pulling away from the package edge portions 20a as the strand guide moves back towards the center of the package 20b, a cylindrical package having square edges is built.

The rolling contact between the rollers and the rotating package surface causes the rollers to rotate. The speed of the roller surface is generally equal to the speed of the package surface and the speed of the strand. When the speeds are equal, there is little abrasive force between the strand and the roller bails.

In the multiple package operation, the fiber forming process is controlled to keep all the packages building, and the package radii increasing, at a similar rate. However, differences in package radii occur during winding because the diameters of the strands are not always equal from package to package. Fluctuations in bushing temperatures, and inconsistencies in material properties can change the diameter of the fibers, and thus the strands, from package to package. Therefore, one package radius may temporarily vary from the others until process corrections are made. Current injection is sometimes used to regulate the temperature of the bushings to control strand diameter. Differences in the radii of the packages can cause the roller bails to occasionally leave the surface of a package. When a roller loses contact with the package surface, the rotational speed of the roller begins to decrease. Later, as the surface of the roller comes back into contact with the package surface, the rotational speed of the roller increases until the surface of the roller is traveling at the same speed as the surface of the package. Due to the lower inertia of the split roller bails, the roller bails spin back up to speed more quickly than a single, heavier prior art roller bail which contacts the package surface from end to end. Since the split roller bails have less inertia, they skid less and produce less abrasive forces against the strands, and therefore are less likely to break any of the individual fibers in the strands. In addition, when the collet is accelerating during startup, the split roller bails produce less abrasive forces against the strand while they are accelerating and, therefore, break few fibers.

Strand fibers that do break tend to separate from the strand as it is wound on the package and wrap around the rotating roller bail, creating a snarl which can ruin the package. The split rollers provide break surfaces which break the snarling, broken fibers. The rollers include cylindrical portions 46a forming contact surfaces which abut the edge portions 20a of the package surface 20, and tapered portions 46b which do not contact the package surface. The tapered surfaces extend from the contact surfaces toward the central portion of the package surface 20b. The ends 46c of the tapered surfaces 46b form the break surfaces. As the strand guide moves the strand away from the roller 46 towards the central portion 20b of the package surface 20, any broken fibers that have begun to wind around the roller will be broken off from the strand 14. Because the strand is no longer in contact with a roller over the central portion of the package, the broken fibers cling to the main body of the strand due to the size mentioned above, and the entire strand is wound around the package. By the time the strand reaches the other roller at the opposite package edge, the broken fibers have been integrated with the strand and the strand has been wound around the package. The broken fibers do not wrap around the other roller. Although the tapered surface 46b having an edge 46c is shown, the break surface can also include any surface discontinuity on the roller such as a groove or shoulder. A discontinuity, or abrupt change in the roller surface will not allow the fiber to continue to wind around the roller; the fiber will be broken as the strand moves across the discontinuity. In addition, a knife edge or similar protrusion spaced apart from the roller surface may be used as a break surface. Although it is preferable for the strand not to contact the roller surface immediately after the snarling fiber has been broken off, it is not required.

The principle and mode of operation of this invention have been described in its preferred embodiment. However, it should be noted that this invention may be practiced otherwise than as specifically illustrated and described without departing from its scope.

INDUSTRIAL APPLICABILITY

The invention can be useful in the production of wound packages of glass fiber reinforcements.

We claim:

1. A roller bail assembly for contacting a rotating cylindrical package of wound strand having first and second ends, an axis of rotation, and a radially outer surface with first and second edge portions and a central portion therebetween, where the roller bail assembly holds the strand in place at the edge portions as the strand is laid on the surface in courses, the roller bail assembly comprising:

a first roller having an axis of rotation generally parallel to the axis of the package, the first roller having an edge end contacting the first edge portion of the package surface and not contacting the central portion of the package surface, and the first roller having an inner end not contacting the package surface; and a second roller having an axis of rotation generally parallel to the axis of the package, the second roller having an edge end contacting the second edge portion of the package surface and not contacting the central portion of the package surface, and the second roller having an inner end not contacting the package surface.

2. The apparatus of claim 1 wherein the edge ends of the first and second rollers are generally cylindrical.

3. The apparatus of claim 1 wherein the inner ends of the first and second rollers are tapered.

4. The apparatus of claim 1 wherein the first and second rollers are generally coaxial.

5. The apparatus of claim 1 wherein the first and second rollers contact the surface of the package along lines that are generally parallel to the axis of rotation.

6. The apparatus of claim 5 wherein the first and second rollers contact the surface of the package along lines having a total length which is generally between about 5% to about 80% of the length of the package between the first and second ends.

7. The apparatus of claim 6 wherein the first and second rollers contact the surface of the package along lines having a total length which is generally between about 10% to about 60% of the length of the package between the first and second ends.

8. An apparatus for winding a mineral fiber strand to build a cylindrical package having first and second ends, and a radially outer surface with first and second edge portions and a central portion therebetween, the apparatus comprising:

a rotatable collet for receiving the strand and winding the strand to build the package;

a guide mounted for reciprocation from edge portion to edge portion to lay the strand in a helical pattern on the package surface as the package rotates; and a roller bail mounted for contacting the package surface as the package is being built for holding the strand in place on the package surface, where the roller bail is divided into separate rollers with each roller having an edge end for contacting the package surface at one of the edge portions and not contacting the package surface at the central portion, and having an inner end not contacting the package surface.

9. The apparatus of claim 8 wherein each of the rollers is independently mounted for rotation.

10. The apparatus of claim 8 wherein the inner ends of each roller are tapered and extend towards the central portion of the package surface.

11. The apparatus of claim 8 wherein the roller bail contacts the surface of the package along a line that is generally parallel to the axis of rotation.

12. The apparatus of claim 8 wherein the roller bail contacts the surface of the package along lines having a total length which is generally between about 5% to about 80% of the length of the package between the first and second ends.

13. The apparatus of claim 12 wherein the roller bail contacts the surface of the package along lines having a total length which is generally between about 10% to about 50% of the length of the package between the first and second ends.

14. The apparatus of claim 8 wherein each of the rollers weighs between about 30 grams to about 80 grams.

15. The apparatus of claim 8 including a cam mounted for rotation and having a helical groove, a cam follower disposed within the groove and attached to the guide for moving the guide from edge portion to edge portion, wherein the cam, the cam follower, the guide and the rollers are mounted on an arm that is mounted for movement away from the collet as the package builds.

16. An apparatus for winding a mineral fiber strand to build a plurality of cylindrical packages, each package having first and second ends, and each package having a radially outer surface with first and second edge portions and a central portion therebetween, the apparatus comprising:

a rotatable collet for receiving the strand and winding the strand to build the plurality of packages;

a guide for each package, mounted for reciprocation from edge portion to edge portion to lay the strand in a helical pattern on the package surface as the package rotates; and a roller bail for each package mounted for contacting the package surface as the package is being built for holding the strand in place on the package surface, where each roller bail is divided into separate rollers with each roller having an edge end for contacting the package surface at one of the edge portions and not contacting the package surface at the central portion, and having an inner end not contacting the package surface.

17. The apparatus of claim 16 including a cam mounted for rotation having a helical groove, a cam follower disposed within the groove and attached to the guide for moving the guide from edge portion to edge portion, wherein the cam, the cam follower, the guide and the rollers are mounted for movement away from the collet as the package builds.

18. The apparatus of claim 16 wherein each of the rollers is independently mounted and has a tapered inner end, and wherein each roller bail contacts the surface of a package along a line of contact having a length which is generally between about 10% to about 50% of the length of the package between the first and second ends.

* * * * *